Dec. 27, 1938.  P. P. RATIÉ  2,141,552
VARIABLE PITCH AIRSCREW
Filed Oct. 31, 1935  2 Sheets-Sheet 1
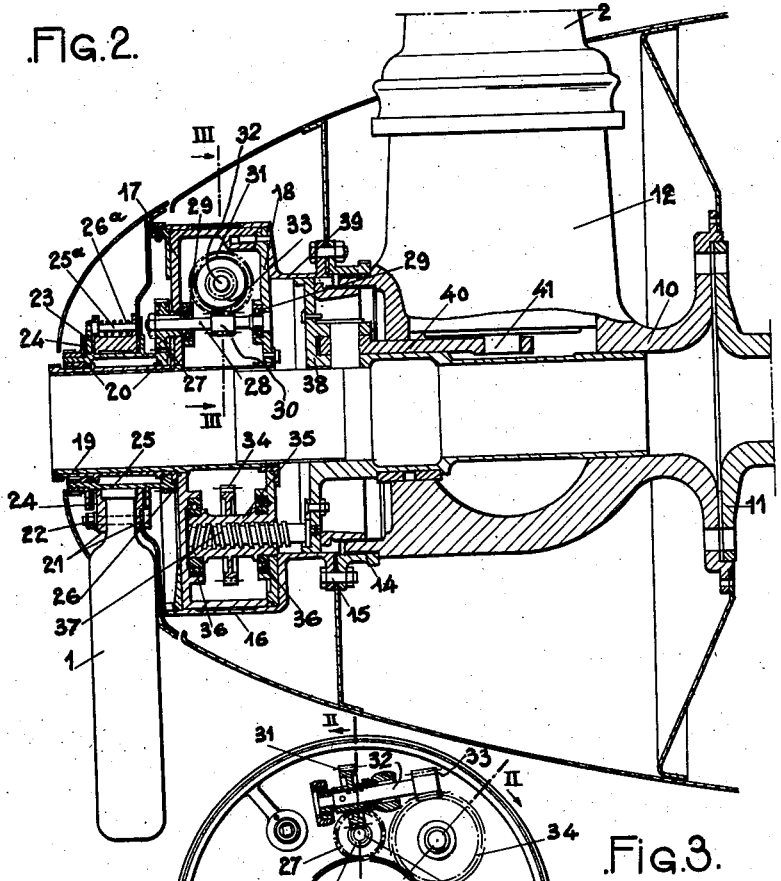
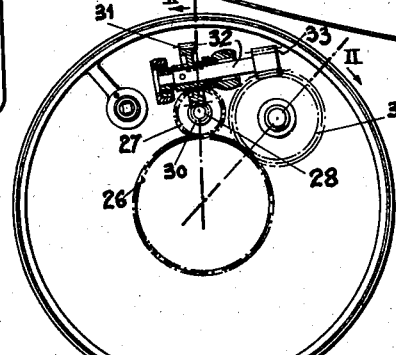
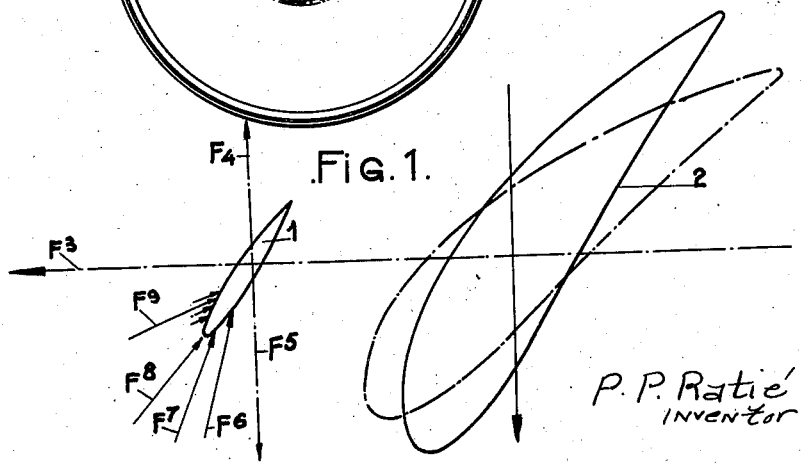

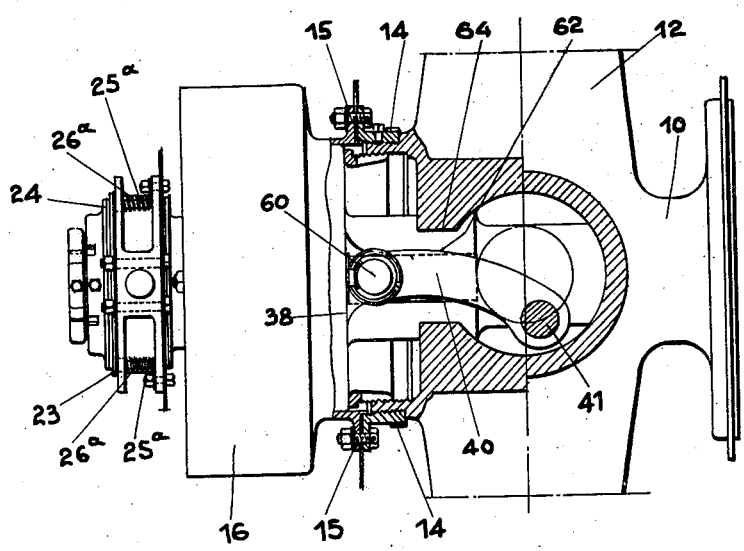

Patented Dec. 27, 1938

2,141,552

UNITED STATES PATENT OFFICE 2,141,552

VARIABLE PITCH AIRSCREW

Pierre Paul Ratié, Montrouge, France, assignor to Societe d'Etudes pour l'Aviation (S. E. P. A.), Montrouge, France Application October 31, 1935, Serial No. 47,698 In France May 31, 1935

1 Claim. (Cl. 170—162)

The present invention relates to an airscrew, the pitch of which is automatically variable during flight and capable of assuming two main positions, and is characterized in that the pivotal movement of the blades, for ensuring the variation of the pitch, is effected by means of a controlling screw or wind-wheel with interposition of a gearing-down device.

In a form of construction, the controlling screw is arranged co-axially with the airscrew and in front of the latter.

Abutments of large pitch and small pitch limit the angular displacement of the blades.

For avoiding shocks at the end of the displacement, a friction clutch is provided which constitutes a torque limiting device acting in both directions.

This friction clutch is particularly fitted up on the hub of the controlling screw.

The blades of the controlling screw are preferably adjustable in position.

The invention further relates to other particular points which will appear from the following description with reference to the accompanying drawings, given by way of example only, in which:

Fig. 1 is an explanatory section of the blades of the controlling screw and airscrew.

Fig. 2 is a side elevation of the device showing the parts in section according to line II—II of Fig. 3 looking in the direction of the arrows, this section showing a form of construction of an airscrew made according to the invention.

Fig. 3 is a front elevation showing the parts in section according to line III—III of Fig. 2.

Fig. 4 is a plan view with partial section corresponding to Fig. 2 and showing the abutment device of the blades.

The drawings show a tractor airscrew which rotates in a counterclockwise direction for an observer placed behind this airscrew. The counterclockwise direction will be designated by the expression "left-hand direction". If the controlling screw is manually moved towards the left (the engine of the airplane being stopped), the blades pivot towards the direction of the largest pitch. On the contrary, if the controlling screw is moved towards the right, the blades pivot towards the direction of the smallest pitch.

When the engine rotates by driving the airscrew in the "left-hand direction", the rotation of the controlling screw relatively to that of this airscrew, is being considered. In other words, when the speed of rotation of the controlling screw, which rotates in the same direction as that of the airscrew, is greater than the speed of rotation of the latter, the direction of rotation of this controlling screw will be designated by the expression "left-hand direction". On the contrary, if the speed of rotation of the controlling screw is lower than the speed of rotation of the airscrew, the direction of rotation of this controlling screw will be designated by the expression "right-hand direction". When the controlling screw rotates at the same speed as that of the airscrew, the blades do not pivot and the pitch remains at a definite value.

Referring more particularly to Fig. 1, this figure shows in section a blade 1 of the controlling screw or wind wheel and a blade 2 of the airscrew.

The direction of advance of the airplane is shown by the arrow $F^3$. The arrows $F^4$ and $F^5$ respectively indicate the direction of retardation of the controlling screw 1 relatively to the airscrew 2 (right-hand direction causing the reduction of the pitch), and the direction of leads or advance of the controlling screw 1 relatively to the airscrew 2 (left-hand direction causing increase of the pitch).

As indicated in Fig. 1, the stream lines on the controlling screw 1 have variable inclinations according to the working speed of airscrew 2 and the speed of translation. For a section 1, situated at a certain distance from the axis of rotation, the inclination is the component of the tangential speed and of the speed of translation. The suction of the airscrew on the controlling screw modifies very slightly this component.

When the airplane is on the ground and stationary, the direction of the stream lines on the controlling screw 1 is indicated by the arrow $F^6$; this direction is such that the controlling screw retards relatively to the airscrew and moves the blades up to the small pitch abutment. When the airplane flies off or when it ascends, the direction of the stream lines is indicated by the arrows $F^7$ and $F^8$ respectively, and, in both these cases, the blades of the airscrew are always held in the small pitch position.

When the airplane is flying horizontally or slightly dives, if the working speed of the engine is reduced, the controlling screw 1 owing to its inertia, rotates more rapidly than the airscrew 2, this causing rotation of the blades substantially towards the large pitch position, and this to a certain extent. But, owing to the fact that the speed of the airplane increases and that the working speed of the engine diminishes, the lead or advance per revolution is such that the direction of the stream lines, which is indicated by arrow $F^9$ causes the controlling screw 1 to rotate more rapidly than the airscrew (arrow $F^5$), this causing the rotation of the blades towards the large pitch position up to the abutment limiting the maximum large pitch. As long as the airplane is flying horizontally, the stream lines $F^9$ hold the blades of the airscrew on the large pitch abutment, as the controlling screw tends to rotate, in the direction of arrow $F^5$, more rapidly than the airscrew.

This controlling screw has two distinct phases.

1. When the speed of the airplane is small, and this up to a speed distinctly defined by the judicious inclination of the blades of the controlling screw (said blades being adjustable), the latter absorbs a certain torque at the airscrew shaft and transmits a portion of its power for propelling the airplane. This is the retardation phase, viz: that of the small pitch.

2. When the lead per revolution of the airscrew exceeds a certain value, the controlling screw supplies a torque on the airscrew shaft and increases the drag of the airplane. The controlling screw acts as driving device, and this is the advance or lead phase viz: that of the large pitch.

It will therefore be seen from the statement, that the pitch of the airscrew is function of its lead per revolution.

The changes of pitch can be obtained during flight in both directions; in fact, contrarily to what has been stated above, it suffices, for obtaining the small pitch, to ascend and to rapidly open the throttle in order that the controlling screw, by its inertia, begins to retard, then, the lead per revolution, when ascending, considerably diminishing, the controlling screw continues to retard up to the small pitch abutment.

Figs. 2 and 3 illustrate a form of construction of an airscrew, the pitch of which is automatically variable and controlled by a controlling screw 1.

The hub 10 of the airscrew is connected to the shaft or driving plate 11 and is provided with a plurality of tubular arms 12 in which the blades 2 of the airscrew are pivotally fitted.

On the hub 10 is screwed a crown 14 connected, through the medium of bolts 15, to a casing 16 in which the gearing-down mechanism is arranged. The casing 16 comprises front and rear walls 17 and 18 on which is secured, co-axially with the airscrew, a tubular support 19 constituting a journal, through the medium of balls 20, for a controlling screw 1. The blades of this controlling screw are adjustable in position and, for that purpose, the roots of these blades are clamped between shells or cheek members 21 drawn together by bolts 22. Moreover, the cheek members 21 are connected to a friction plate 23 constantly urged against friction washers 24 by rods 25ª and springs 26ª. The unit, constituted by the controlling screw 1, cheek members 21 and plate 23, is frictionally connected to the hub 25 journalled, through the medium of the balls 20, on the tubular support shaft 19.

This friction connection prevents sudden stoppage of the airscrew blades reaching the position of maximum or minimum pitch. This friction connection constitutes a friction clutch avoiding any sudden movement of the blades, when a variation of the pitch takes place. Moreover, this connection constitutes a torque limiting device.

The hub 25 is provided with teeth 26 co-axial with the driving shaft and meshing with a series of peripheral pinions 27. Each pinion 27 is rigidly secured on a shaft 28 journalled, through ball bearings 29, on walls 17 and 18. Each shaft 28 carries a worm 30 meshing with a worm wheel 31 rigid with a shaft 32 journalled within the casing 16. The shaft 32 carries a worm 33 meshing with a worm wheel 34 the hub 35 of which is journalled, through the medium of ball bearings 36, in the walls of the casing. This hub 35 is internally provided with a screw thread for constituting a nut angularly movable only, and which causes the displacements in translation of screws 37 rigid with a plate or piston 38 capable of moving in translation in a corresponding cylindrical bearing portion 39 of casing 16. On piston 38 are pivoted links 40 pivotally connected at their other end to eccentric studs 41 rigid with the blade roots.

When the controlling screw 1 rotates at the same speed as the airscrew, no relative movements take place between the toothed wheels 26 and 27, so that the piston 38 remains stationary, the airscrew preserving the same pitch. Any relative displacement between the controlling screw and the airscrew causes the displacement of the gearing down mechanism and a movement of translation of piston 38 in one direction or the other for increasing or diminishing the pitch of the airscrew according to circumstances.

It is obvious that the form of construction described and illustrated is given herein by way of indication only and not in a limiting sense. All changes or modifications which do not alter in any way the main features above set forth and the desired result, remain included in the scope of the present invention.

In Fig. 4 has been more particularly illustrated the abutment system of one of the links 40 which is pivoted, by a pin 60, on the piston 38 and by a stud 41 on the root of the corresponding blade. The part 62 of the link 40 presses, in the extreme positions of the blades, against the abutment 64 formed by an inner projection of the hub of the airscrew.

What I claim as my invention and desire to secure by Letters Patent is:

In a unit for aerial propulsion, comprising a variable pitch airscrew, a wind wheel the pitch of which is fixed during flight, mounted co-axially with said airscrew for rotation in the same direction as and at the same or a greater or less speed than the latter, a shaft for rotatively supporting the wind wheel, a connection mechanism between the wind wheel and the airscrew for moving the blades of said airscrew in one direction or the other in order to modify the pitch of said blades when a difference of speed exists between the wind wheel and airscrew in combination, abutments for limiting the angular displacements of the blades of the airscrew in the large pitch and small pitch positions, means for frictionally connecting said wind wheel and said shaft on which said wind wheel is mounted for avoiding, at the end of the displacement, shocks of the blades against said abutments and which constitutes a device for limiting the torque in both directions, and means for adjustably assembling, when on the ground, the blades of the wind wheel, the pitch of said wind wheel having such value that the aerodynamic torque exerted on the same changes the speed thereof to effect a relative rotary displacement of said wind wheel relatively to said airscrew in one direction or the other, when, for one and the same speed of rotation of the airscrew, the speed of translation of said airscrew departs from a definite value, or when for one and the same speed of translation of the airscrew, the speed of rotation of said airscrew departs from a definite value.

PIERRE PAUL RATIÉ.